L. HILL.
Corset-Steel Fastening.

No. 222,400. Patented Dec. 9, 1879.

Witnesses.
A. Hunerwadel
Jos. P. Livermore

Inventor.
Lucian Hill
by Crosby & Gregory Attys

UNITED STATES PATENT OFFICE.

LUCIAN HILL, OF NORTH BROOKFIELD, ASSIGNOR TO T. C. BATES, OF SAME PLACE, AND D. H. FANNING, OF WORCESTER, MASSACHUSETTS.

IMPROVEMENT IN CORSET-STEEL FASTENINGS.

Specification forming part of Letters Patent No. 222,400, dated December 9, 1879; application filed September 24, 1879.

*To all whom it may concern:*

Be it known that I, LUCIAN HILL, of North Brookfield, county of Worcester, State of Massachusetts, have invented an Improvement in Corset-Steel Fastenings, of which the following description, in connection with the accompanying drawings, is a specification.

This invention relates to improvements in corset-steel fastenings, whereby the eye and hook or stud parts of the steel may be held together, and the accidental unhooking of the steels be prevented.

This invention is intended to be an improvement on the invention shown in United States Letters Patent No. 218,386, dated August 12, 1879, wherein a yielding plate-spring was shown as adapted to engage the stud or hook below its head.

In this my invention I employ a fastening device composed of a bifurcated or jaw-like or wire spring attached to that half of the set of steels carrying the usual eye part, the said fastening being so shaped as to permit the head of the usual hook or stud to be passed inward through the larger part of the opening for it in the usual eye, after which the stud, in moving to the smaller part of the said eye, crowds the said fastening aside, and on the stud reaching the end of the said eye the said fastening springs back to its normal position and acts as a stop against accidental return motion of the said stud in the slot of the said eye.

Figure 1:
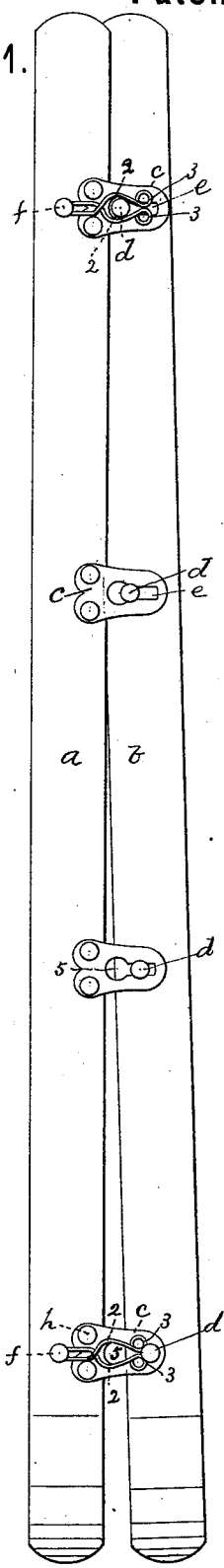
Figure 2:
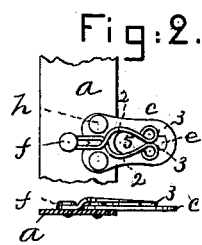
Figure 3:
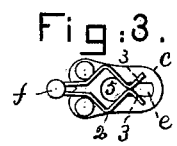
Figure 4:

Figure 1 represents, in perspective, a pair of corset-steels of usual construction provided with my invention; Fig. 2, a top view and section of the eye and connected expanding fastening and steel; and Figs. 3 and 4, modifications, wherein the wire arms or springs of the fastener are not crossed.

The steels $a\,b$ and the eye $c$ and hook or stud $d$ are and may be of usual construction. Upon the steel $a$, near the eye $c$, and so as to extend along the side of slot $e$ therein, I have secured, in this instance by a rivet, $f$, the fastening device, herein shown as a wire bent, as at 2 3, the bend 3, near the free ends of the wire, terminating above the slot near its outer end, or so near thereto as to leave a space for the shank of the hook or stud $d$.

The recess formed between the bends 3 permits the passage of the hook or stud $d$ through the enlarged part 5 of the eye, and the stud, as it is moved along the said slot from the position shown at top to the position shown at bottom of Fig. 1, acts upon the bent portion 3 of the fastening and crowds it back; but the spring arm or wire so crowded outward flies back as the stud $d$ passes beyond 3, and the said portions 3 of the fastening then act as stops to prevent the accidental backward movement of the said stud along the said slot.

The shape of this expanding fastening may be variously modified without departing from my invention.

I do not desire to limit my invention to the exact means shown for attaching the expanding springs to the steel. It is obvious that the wire might be bent about the shanks of the rivets $h$, which attach the eye-piece to the steel, as in Fig. 4.

I claim—

In a corset-fastening, a spring-fastening device composed of wire bent to spring laterally across the opening in the usual eye, to operate upon the stud, substantially in the manner shown and described.

In testimony whereof I have signed my name to this specification in the presence of two subscribing witnesses.

LUCIAN HILL.

Witnesses:
  CHAS. E. JENKS,
  CHAS. PEPPER.